(12) United States Patent
Bieber et al.

(10) Patent No.: US 11,333,240 B2
(45) Date of Patent: May 17, 2022

(54) SMOOTH GEAR CHANGE DURING INCHING

(71) Applicant: ZF Friedrichshafen AG, Friedrichshafen (DE)

(72) Inventors: Sven Bieber, Markdorf (DE); Thomas Kurz, Langenargen (DE); Andreas Schwarz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/867,967

(22) Filed: May 6, 2020

(65) Prior Publication Data

US 2020/0362962 A1    Nov. 19, 2020

(30) Foreign Application Priority Data

May 16, 2019  (DE) ..................... 10 2019 207 105.8

(51) Int. Cl.
  *F16H 61/04*   (2006.01)
(52) U.S. Cl.
  CPC ................... *F16H 61/0403* (2013.01)
(58) Field of Classification Search
  None
  See application file for complete search history.

(56) References Cited

U.S. PATENT DOCUMENTS

| 5,040,648 | A | * | 8/1991 | Mitchell | ............... F16D 48/066 192/3.58 |
| 5,456,333 | A | * | 10/1995 | Brandt | .................. B60W 10/02 180/336 |
| 7,165,662 | B2 | | 1/2007 | Kühner et al. | |
| 2011/0303505 | A1 | * | 12/2011 | Clark | ......................... F16H 3/10 192/82 R |
| 2018/0045254 | A1 | * | 2/2018 | Bulgrien | ............... F16D 48/062 |
| 2018/0223918 | A1 | * | 8/2018 | Bulgrien | ................. F16D 48/06 |

FOREIGN PATENT DOCUMENTS

| DE | 102 36 090 A1 | 2/2004 |
| DE | 10 2005 060 877 A1 | 6/2007 |
| EP | 2 098 755 A1 | 9/2009 |

OTHER PUBLICATIONS

German Search Report Corresponding to 10 2019 207 105.8 dated Aug. 8, 2019.

\* cited by examiner

*Primary Examiner* — Colby M Hansen
(74) *Attorney, Agent, or Firm* — Finch & Maloney PLLC; Michael J. Bujold; Jay S. Franklin

(57) ABSTRACT

A method of shifting a transmission in which a clutch, located in the torque flow, in a first gear and in a second gear is controlled in such manner that, in the first gear, the clutch slips and transmits a first torque and, in the second gear, the clutch slips and transmits a second torque. The second torque is chosen such that an output torque of the transmission remains the same when shifting from the first gear to the second gear.

3 Claims, 1 Drawing Sheet

SMOOTH GEAR CHANGE DURING INCHING

This application claims priority from German patent application serial no. 10 2019 207 105.8 filed May 16, 2019.

FIELD OF THE INVENTION

The invention relates to a method for shifting a transmission, a control unit and a computer program product.

BACKGROUND OF THE INVENTION

The document DE 102 36 090 A1 describes a transmission that can be operated by means of the method according to the invention. It is a transmission of a mobile vehicle. For example, it can be a transmission of a working machine such as a wheel loader, a forklift or a truck.

The transmission can be shifted and has fixed gear ratio steps. In the torque flow of a drive-train there is arranged a friction clutch which is brought to controlled slipping operation when an inching pedal is actuated in order to reduce the driving speed of the vehicle. In the case of working machines, this is necessary since with such vehicles low speeds are needed when taking up loads but in that condition the working hydraulic system needs its maximum power. For that driving condition, it is necessary to keep the drive engine running at its maximum possible rotational speed, in order to be able to operate the hydraulic pump connected to it at maximum rotational speed and to operate the friction clutch in a slipping condition in order to reduce the travel speed. For this, when the inching pedal is actuated the actuation force of the friction clutch can be reduced in such manner that a minimal actuation path of the inching pedal reduces the actuation force on the friction clutch only slightly, when the inching pedal is actuated some more the actuation force on the friction clutch is reduced further, and above a defined actuation path of the inching pedal for further reducing the travel speed, the service brake of the vehicle is also activated.

When the described traction force modulation by means of the inching pedal involves a speed change of the vehicle, a gearshift may be needed. This has the consequence that a drive output torque or output torque of the transmission changes due to the transmission gear ratio change that results from the gearshift. A driving situation arises that does not correspond to the driver's wish. The driver perceives this as annoying. Moreover, in critical driving situations the risk of accident increases.

SUMMARY OF THE INVENTION

The purpose of the present invention is at least partially to avoid the disadvantages inherent in the systems known from the prior art. In particular, the driver of a mobile working machine should be relieved of stress and operating safety should be increased.

This objective is achieved by a method, a control unit and a computer program product according to. Preferred further developments emerge from the example embodiment illustrated in FIG. 2.

The method according to the invention is a method for carrying out gearshifts in a transmission. The transmission is preferably part of a drive-train of a mobile vehicle such as a mobile working machine, for example a wheel loader, a stacker or a truck. The drive-train also comprises an engine whose output torque is passed on as the input torque of the transmission. Thus, an input shaft of the transmission is acted upon by the output torque of the engine. The transfer of the output torque of the engine to the input shaft of the transmission usually takes place by way of a hydrodynamic torque converter.

An output torque of the transmission is passed on to one or more driven wheels of the vehicle. An output shaft of the transmission acted upon by the output torque is therefore connected to the driven wheels in a torque-transferring manner.

The transmission is preferably a powershiftable transmission with at least a first and a second gear. A powershiftable transmission is characterized in that the gear ratios can be changed under load, i.e. without interrupting the torque transmitted from the input shaft to the output shaft. In the present case a shift can be carried out under load from the first gear into the second gear.

The term gear means a fixed transmission ratio of a transmission. Thus, in the first gear the present transmission produces a first fixed transmission ratio between the input shaft and the output shaft. Correspondingly, in the second gear a second fixed transmission ratio is produced between the input shaft and the output shaft. The first and second transmission ratios are different from one another. In particular, the first transmission ratio can be higher than the second transmission ratio or lower than the second transmission ratio.

In this case a clutch is so arranged that it is located in the torque flow in the first and in the second gear. The torque flow is a torque flow transmitted by the transmission. It is the flow of a torque which starts from the engine as an output torque and passes into the transmission, is conveyed by the transmission, and is passed on by the transmission as an output torque of the transmission to the driven wheels. Depending on the transmission the clutch can be connected upstream or downstream or integrated in the transmission, i.e. it can be part of the transmission. In the case of a clutch connected upstream from the transmission, the torque is passed from the engine into the transmission by way of the clutch. A downstream clutch transmits the output torque of the transmission to the driven wheels.

As described earlier, to adjust the speed of the vehicle at high engine speeds the clutch is operated in the slipping range. Thus, to adjust the speed of the vehicle, the clutch is controlled in such manner that it slips.

A slipping clutch transmits torque with different input and output rotational speeds. The input rotational speed is the rotational speed at which an input or input shaft of the clutch rotates. Correspondingly, the output rotational speed is a rotational speed at which an output or output shaft of the clutch rotates.

The clutch can be controlled in such a way that the torque transmitted during slip varies. This can be a friction clutch controlled by a hydraulic control pressure (the inching pressure). As a function of the control pressure, the contact pressure of the friction partners or clutch disks varies. Thereby the slip also varies, i.e. the rotational speed difference between the input and output and the torque transmitted does so as well.

The method according to the invention provides that the clutch is controlled in such manner that it slips in both the first and in the second gear, transmitting a first torque in the first gear and a second torque in the second gear. Depending on the design of the clutch, control can take place for example by modification of the control pressure. In that case the control pressure has a first value in the first gear and a second value in the second gear.

The second torque is chosen such that a drive torque remains constant when shifting from the first gear to the second gear. This can be achieved by a suitable choice of the second control pressure value.

The drive torque is the torque that acts upon one or more driven wheels of the vehicle. The driver indicates a target value of the drive torque by actuating the operating element of the vehicle. Thanks to the invention, the drive torque follows the driver's specification even during a gearshift.

A control unit according to the invention serves to control or regulate the transmission described above. The control unit is designed to control or regulate the transmission in accordance with the method according to the invention.

A control unit is defined, for example, in Peter Scholz: "*Software development of embedded systems: Fundamentals, modeling, quality assurance*" (Springer, 2005). It is an embedded system in which functions for the control or regulation of at least one component external to the control unit are implemented. In the present case the component external to the control unit is the transmission.

A computer program product according to the invention is designed to enable a control unit to carry out the method according to the invention.

BRIEF DESCRIPTION OF THE DRAWINGS

A method according to the prior art is illustrated in FIG. 1.

FIG. 2: Corresponding variations according to the invention.

DETAILED DESCRIPTION OF THE PREFERRED EMBODIMENTS

Figure 1:
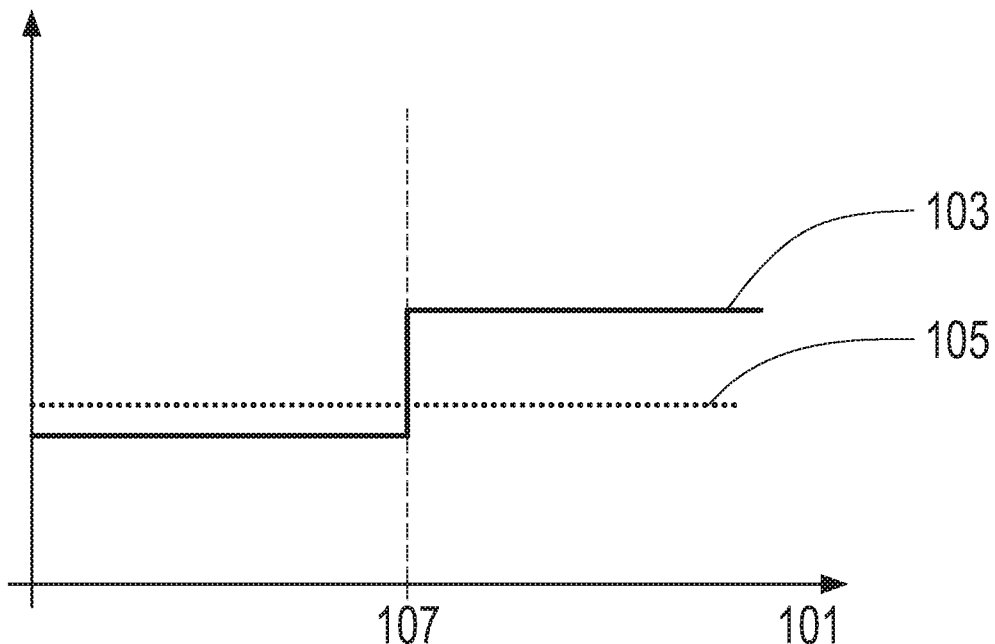
FIG. 1: Variations of the traction force and inching pressure as a function of a brake pedal path, according to the prior art.
Figure 2:
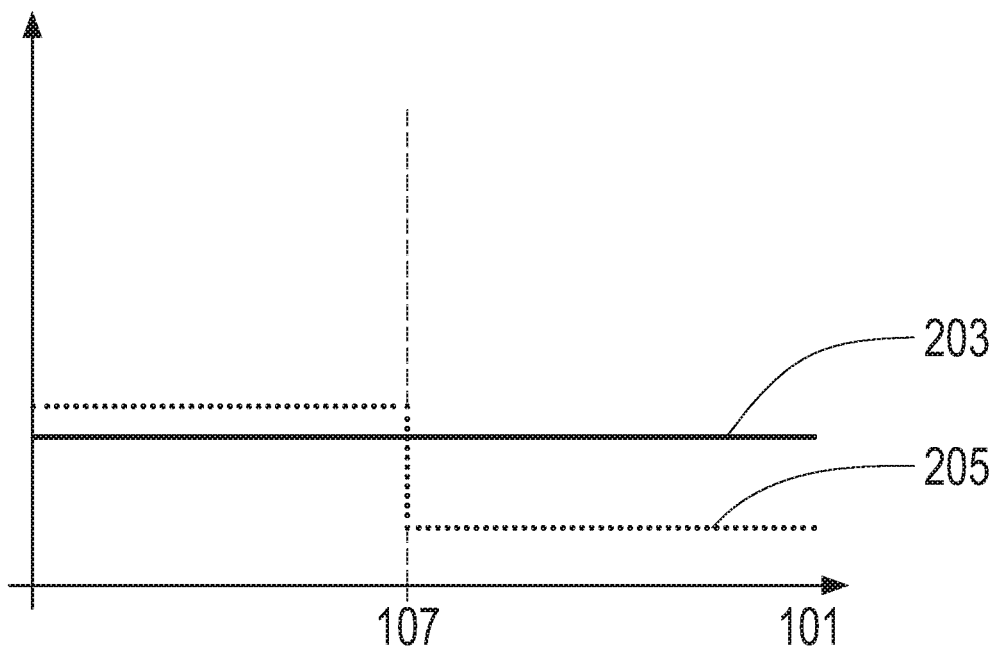
FIG. 2 shows an example embodiment of the method according to the invention. In detail, the figures show.

A brake pedal path 101 is plotted along the abscissa of the diagrams shown in FIGS. 1 and 2. A traction force 103 or 203, respectively, and an inching pressure 105 or 205, respectively, are plotted on the ordinates. The traction force 103 or 203 correspond to a drive torque applied to the driven wheels of a vehicle. As a result of the drive torque, a force acts upon the vehicle in the travel direction or opposite to that direction. The force is called the traction force.

The inching pressure is a modulation pressure applied to a clutch located in a torque flow from the engine of the vehicle to the driven wheels. As a function of the inching pressure, the contact pressure of the clutch disks and consequently the slip and the torque transmitted by the clutch vary.

If the brake pedal path 101 exceeds a shifting threshold 107, the transmission shifts to another gear. If the inching pressure 105 is constant as in FIG. 1, the shifting process results in a sudden increase of the traction force 103.

The example embodiment of the method according to the invention shown in FIG. 2 provides that the inching pressure 205 is reduced as soon as the brake pedal path 101 exceeds the shifting threshold 107. The modulation of the inching pressure 205 takes place in such manner that the traction force 203 remains constant on either side of the shifting threshold 107.

INDEXES

101 Brake pedal path
103 Traction force
105 Inching pressure
107 Shifting threshold
203 Traction force
205 Inching pressure.

The invention claimed is:

1. A method of shifting a transmission, the method comprising:
controlling a clutch, which is located in a torque flow, in a first gear and in a second gear in such a manner that:
in the first gear, the clutch slips and transmits a first torque,
in the second gear, the clutch slips and transmits a second torque; and
when shifting from the first gear to the second gear, selecting the second torque as the torque to be transmitted by the transmission and varying an inching pressure of the clutch such that a drive torque, outputted by the transmission, remains constant during a shift from the first gear to the second gear.

2. A control unit for a transmission, wherein the control unit is designed to control a clutch which is located in a torque flow in a first gear and in a second gear, in such a manner that:
in the first gear, the clutch slips and transmits a first torque,
in the second gear, the clutch slips and transmits a second torque; and
when shifting from the first gear to the second gear, selecting the second torque as the torque to be transmitted by the transmission and varying an inching pressure of the clutch such that a drive torque, outputted by the transmission, remains constant during a shift from the first gear to the second gear.

3. A computer program product, designed to enable a control unit to carry out a method including controlling a clutch, which is located in torque flow, in a first gear and in a second gear in such a manner that in the first gear, the clutch slips and transmits a first torque, and in the second gear, the clutch slips and transmits a second torque; and when shifting from the first gear to the second gear, selecting the second torque as the torque to be transmitted by the transmission and varying an inching pressure of the clutch such that a drive torque, outputted by the transmission, remains constant during a shift from the first gear to the second gear.

* * * * *